United States Patent
Wise (10) Patent No.: US 11,039,092 B2
(45) Date of Patent: Jun. 15, 2021

(54) SPARSE SCANOUT FOR IMAGE SENSORS

(71) Applicant: NVIDIA Corporation, Santa Clara, CA (US)

(72) Inventor: Joshua Wise, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/185,265

(22) Filed: Nov. 9, 2018

(65) Prior Publication Data

US 2019/0149751 A1 May 16, 2019

Related U.S. Application Data

(60) Provisional application No. 62/586,396, filed on Nov. 15, 2017.

(51) Int. Cl.
*H04N 5/345* (2011.01)
*H04N 7/08* (2006.01)
*H04N 7/12* (2006.01)

(52) U.S. Cl.
CPC ............. *H04N 5/3454* (2013.01); *H04N 7/08* (2013.01); *H04N 7/12* (2013.01)

(58) Field of Classification Search
CPC .......... H04N 5/3454; H04N 7/08; H04N 7/12; H04N 9/77
See application file for complete search history.

(56) References Cited

U.S. PATENT DOCUMENTS

| | | | |
|---|---|---|---|
| 6,560,285 B1 * | 5/2003 | Reitmeier | H04N 21/23614 375/240.16 |
| 2016/0301870 A1 * | 10/2016 | Matsuoka | H04N 5/23254 |
| 2017/0251189 A1 * | 8/2017 | Tsukagoshi | H04N 19/186 |

* cited by examiner

*Primary Examiner* — Padma Haliyur
(74) *Attorney, Agent, or Firm* — Nixon & Vanderhye PC (57) ABSTRACT

To support sparse scanout of an image sensor, an image data protocol such as the MIPI CSI protocol is extended with support for pixel coordinates in long packets. The receiver uses these to compute where in memory these pixels should be stored or where on a display they should be displayed. Truly sparse scanout is supported for any arbitrarily shaped image areas including for example elliptical readout for fisheye lenses. These techniques save MIPI and serializer/deserializer bandwidth in automotive and other applications, allowing for more cameras per vehicle or other host. Such techniques can be implemented in a way that is compatible with prior MIPI standardized approaches.

18 Claims, 11 Drawing Sheets

Fig. 1

Fig. 2A MIPI CS2 Standard Protocol (Prior Art)

SPARSE SCANOUT FOR IMAGE SENSORS

CROSS-REFERENCE TO RELATED APPLICATIONS

This application claims benefit of U.S. Provisional Patent Application No. 62/586,396 filed Nov. 15, 2017, incorporated herein in its entirety by reference.

STATEMENT REGARDING FEDERALLY SPONSORED RESEARCH OR DEVELOPMENT

None.

FIELD

The technology herein relates to image sensor readout, and more particularly to systems, methods, programs and computer readable media for reading out and/or transmitting less than all image data acquired by an image sensor. The technology herein also relates to improved high-speed protocols for point-to-point image and video transmission between cameras and host devices.

BACKGROUND & SUMMARY

Most image sensors scan out the entire frame in a rectangular (raster) order. However, some applications—notably, augmented reality (AR), virtual reality (VR) and automotive—use lenses (for instance, fisheye lenses) that do not fill the entire frame, so wasted pixels are transmitted over the image link.

Rectangular cropping works for some lenses, but is not usually useful for fisheye lenses. Additionally, some applications wish to transmit non-contiguous cropping regions ("regions of interest" or "ROIs"), which also would benefit from transmitting less than all of the pixels a particular image representation is capable of encoding, e.g., only the pixels in the image that are used—which is not a simple rectangular crop. Also, single rectangular cropping typically does not permit multiple regions of interest.

Others have attempted to solve the region-of-interest problem, but not necessarily the fisheye problem. For instance, some have proposed a sparse scanout that uses short packets. Short packets can be expensive on legacy PHY implementations such as some D-PHY and C-PHY physical layer implementations (e.g., those that do not have Latency Reduction and Transport Efficiency or LRTE, which was introduced in MIPI CSI-2 v2.0 to provide more bandwidth per packet for the same link speed) and may not be trivial even with modern PHYs. Even given modern PHYs, the short packet approach would not necessarily be supported by serializers and deserializers ("serdes"—typically hardware/devices that efficiently serialize and deserialize image streams) in the ecosystem. Such proposals also do not extend their solutions to fisheye bandwidth reduction. In particular, prior proposals typically consider usage to highlight regions of interest, but not to non-rectangular lenses.

Still others have proposed sending long packets tagged with region of interest IDs, rather than with direct coordinates. This solution would be costly to implement on a system on a chip ("SoC"). Others have proposed preallocating virtual channels for regions of interest, but there are some shortcomings to that approach as well, one of which is the challenge of implementing such an approach in an SoC implementation.

Further improvements are possible.

DETAILED DESCRIPTION OF EXAMPLE NON-LIMITING EMBODIMENTS

While many prior solutions rely on regions of interest identification and encoding, non-limiting examples herein split region-of-interest information functionality from sparse scanout information functionality. Addressing sparse scanout independently from regions-of-interest is useful because if one puts aside the region-of-interest feature, it is possible to scan out arbitrary (non-rectangular) shapes such as for example an ellipse or any other desired shape. It is further possible in some example non-limiting implementations to use sparse scanout functions to enable, support or complement high-efficiency region-of-interest identification if desired, but sparse scanout as described herein has significant flexibility and functionality (e.g., enabling non-rectangular high-efficiency image cropping) beyond region-of-interest identification.

In one example non-limiting embodiment, to support sparse scanout, the MIPI CSI protocol is extended with support for pixel coordinates in long packets. The receiver/decoder uses these pixel coordinates to compute where in memory these pixels should be stored and/or where on a display they should be displayed. One embodiment extends the protocol header to include pixel coordinates. This approach would not be backwards compatible (and would interfere with serdes). Another option would be to use pixel data, if mutually negotiated by the SoC and the image sensor. Pixel coordinates for crop regions on the sensor in non-rectangular crops can be computed with a low-cost approximation (for instance, a piece-wise linear curve for start and stop X coordinates).

Such example non-limiting techniques as disclosed herein can be used for truly sparse scanout of any arbitrarily shaped images areas including for example elliptical readout. These techniques will be helpful to save MIPI and serializer/deserializer ("serdes") bandwidth in automotive, telepresence, surveillance and other applications, allowing for more cameras per vehicle or other host and/or lower cost serdes.

Such techniques can be implemented in a way that is compatible and non-disruptive with prior MIPI standardized approaches.

Example non-limiting implementations provide image data transmission comprising: defining a scanout area smaller than an image area; determining a starting position of a portion of the scanout area; and including, within a long packet of a serial image data transmission, (a) image data from the scanout area portion, and (b) a coordinate indicating the determined starting position of the scanout area portion.

The coordinate may be paired with a further coordinate indicating line number. Region of interest information may be embedded corresponding to the defined scanout area. Some embodiments do not transmit portions of the image area outside the defined scanout area.

The defined scanout area may for example be elliptical, rectangular, or of arbitrary shape.

A system may subsequently transmit a further long packet different from the first-mentioned long packet, the further long packet not including any coordinate and containing image data to be located using the coordinate indicating the determined starting position of the scanout area portion that was included in the first-mentioned long packet.

Another non-limiting implementation provides a system for sparse scanout transmission comprising: an image sensor configured to select a scanout area smaller than an image area, and to determine a starting position of a line corresponding to a portion of the selected scanout area; and an interface configured to include, within a long packet of a serialized image data interface transmission, a coordinate indicating the starting position of the line corresponding to selected scanout image data contained in the long packet.

The coordinate may be paired with a further coordinate indicating line number.

The interface may be configured to embed region of interest information corresponding to the selected scanout area.

The interface may be configured to not transmit portions of the image area outside the selected scanout area.

The selected scanout area may be elliptical, rectangular, or of arbitrary shape.

The interface is configured to subsequently transmit a further long packet not including a coordinate, the further long packet containing image data to be located using a previously-transmitted coordinate.

Another example non-limiting implementation provides a sparse scanout receiver comprising: an interface configured to receive a long packet including a coordinate indicating a starting position of a line corresponding to scanout image data contained in the long packet; the interface being further configured to receive a further long packet not including a coordinate indicating a starting position of a line corresponding to further scanout image data contained in the further long packet; and a processor operatively coupled to the interface, the processor configured to apply the coordinate to a horizontal starting position of the further scanout image data while incrementing a line designator for the first-mentioned scanout image data to obtain a line designator for the further scanout image data.

Another example non-limiting implementation provides, an a MIPI CSI-2 protocol of the type including short packets and long packets, the long packets including a packet header (PH) indicating the length of a payload containing serialized image data, an improvement comprising: (a) including a pair of coordinates in at least some long packet payloads or in an extended packet header, the coordinate pair indicating the upper lefthand corner position in a planar coordinate space associated with serialized image data within one or more payloads; and (b) including within the long packet headers an indicator that the packet contains a coordinate pair.

Region of interest information may be embedded in further long packets. In some implementations, only some long packet payloads contain coordinate pairs.

Example Non-Limiting System

Figure 1:
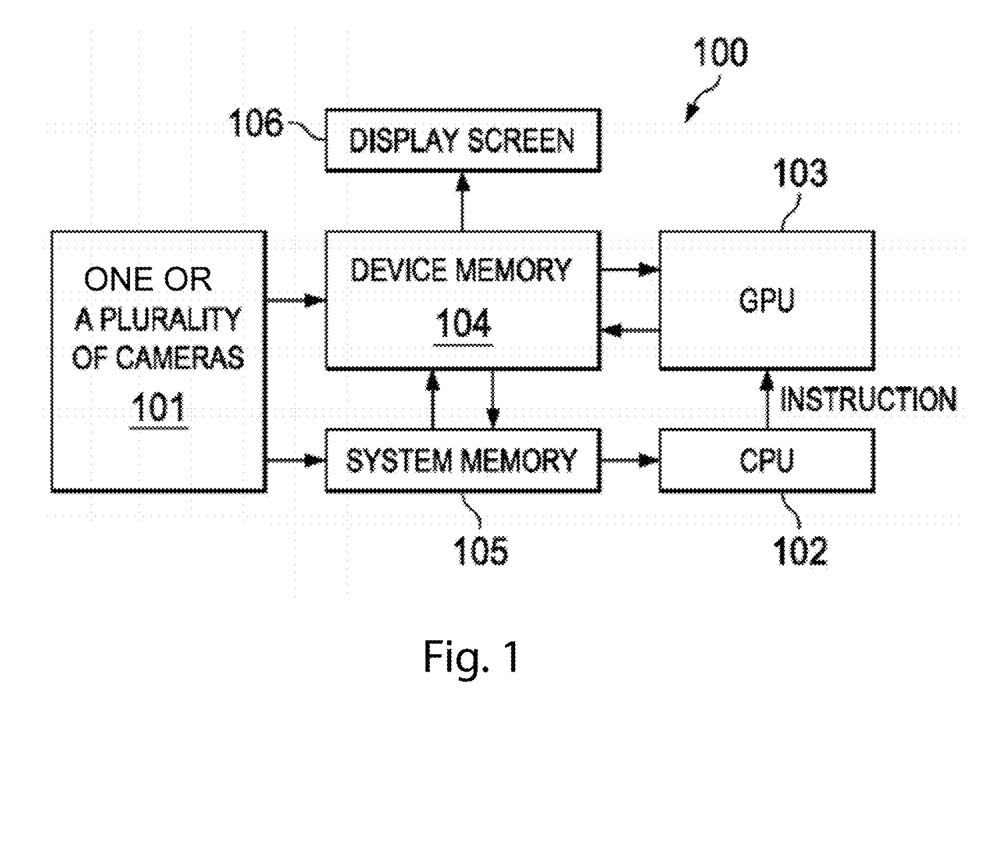
FIG. 1 is a schematic diagram of an example system including an image sensor and a host.

FIG. 1 illustrates a schematic block diagram of a system 100 for generating video, according to a non-limiting embodiment. System 100 includes one or a plurality of cameras 101, and a host or other device that in some instances may be or include for example a mobile device. The one or plurality of cameras 101 may be operable to capture video frames from one or more different directions to generate one-channel or multi-channel video streams. The host device may use the generated images for various purposes including but not limited to for example pattern recognition for self-driving vehicles having many high resolution cameras imaging the self-driving vehicle from all sides and often using fisheye lenses (see discussion below).

In one example embodiment, the mobile device includes a system on a chip (SOC) processor containing a CPU (central processing unit) 102 and a GPU (graphics processing unit) 103 which are integrated within or otherwise connected to the SOC. In some instances, GPU 103 may have higher capability to perform floating point arithmetic and/or parallel arithmetic than CPU 102. The CPU 102 may be configured to issue to the GPU 103 instructions to process the one-channel or multi-channel video streams by using e.g., parallel computing. The GPU 103 may process a large amount of image data in parallel for any desired purpose including pattern recognition, image compression, or the like. Other implementations such as general purpose computing hardware executing software instructions stored in non-transitory memory, special purpose or application specific hardware implementations, server implementations, gate array implementations, and other variations are contemplated within the scope of this disclosure.

In one embodiment, the one or a plurality of cameras 101 may each include a CMOS sensor and an associated CMOS sensor and camera control interface ("CCI") or other interface for transferring a corresponding video stream to the GPU 103. The CCI may operate based on the Mobile Industry Processor Interface ("MIPI") standard such as CSI-2 v1.3 or any version or improvements on that standard and associated protocol. The CSI-2 Specification defines standard data transmission and control interfaces between the camera as a peripheral device and a host processor, which is typically a baseband, application engine. The MIPI CSI-2 protocol contains transport and application layers and natively supports various physical layers (PHYs) such as C-PHY, D-PHY, or combo C/D-PHY. The CCI camera control interface for both physical layer options is bi-directional and compatible with the I2C, SPI and other serial communications standards. The cameras 101 and camera interfaces to memory devices 104, 105 each provide hardware and/or software to operate in accordance with this standardized protocol, and connections between them are structured to comply with the standardized protocol.

MIPI CSI-2 Standard

The MIPI standard provides multiple physical layers including D-PHY and C-PHY. D-PHY as used in CSI-2 is a unidirectional differential interface with one 2-wire forwarded clock lane and one or more 2-wire data lanes. C-PHY consists of one or more unidirectional 3-wire serial data lanes or "trios", each with its own embedded clock. A combination PHY is also possible. The way these D-PHY and C-PHY approaches have been used in the past generally has been based on an assumption of a rectangular readout.

Figure 2A:
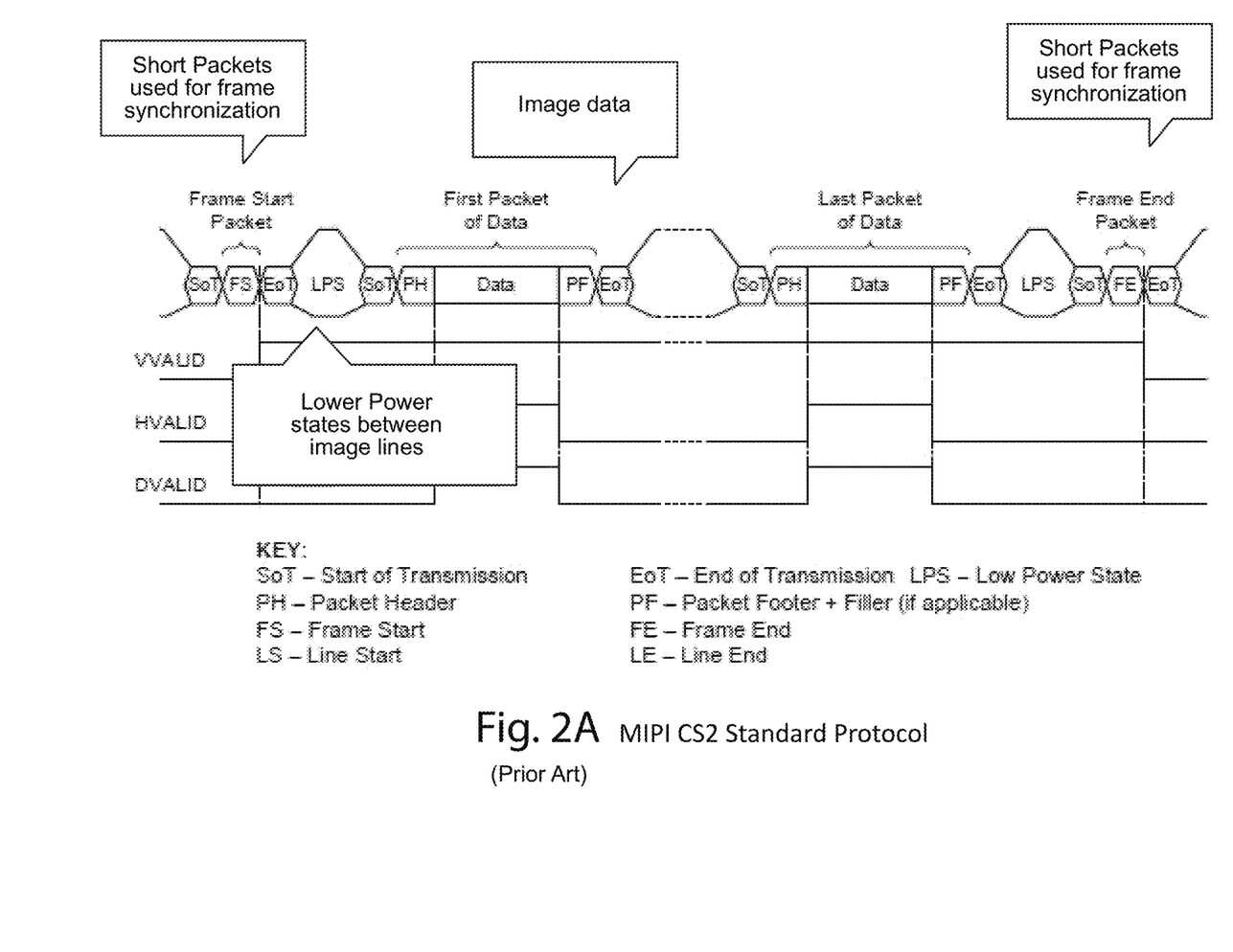
FIG. 2A shows an example standardized serial camera data protocol.

FIG. 2A shows a MIPI CSI-2 standard transmission protocol include initial and ending "short" packets used for frame synchronization. These "short" packets contain a small amount of metadata and no image data, and are used primarily to indicate Frame start and Frame end. Image data is transmitted in the payload of one or more "long" packets. Each "long" packet is delimited by an initial Packet Header ("PH") that signals that a long packet is to follow, and indicates the packet length of the image data payload to follow (this length is variable). A Packet Footer ("PF") is transmitted after the image data payload. As can be seen in the diagram, significant time can be required to transition from idle mode to transmitting a short packet. See also e.g., the MIPI Alliance Specification For Camera Serial Interface 2 CSI-2, "MIPI Alliance Specification for D-PHY" (Sep. 22, 2009, pp. 1-123) and other information available at www.mipi.org.

Image Sensors

In the FIG. 1 example system, the camera(s) 101 may be implemented using a rectangular CMOS, CCD or other image sensor typically comprising or including a rectangular array of image cells. Each cell in the array accumulates charge relating to the intensity of exposure to light for a certain duration, including (for color sensors) the intensities of different colors of light (e.g., Red, Green and Blue). The number of image cells of the CMOS sensor determines the resolution of the image. High resolution image sensors can have millions of image cells and sometimes multiple wells per photodiode, for multiple exposures, resulting in large quantities of captured data.

A typical camera constructed using a digital image sensor as described above typically includes a lens that focusses light onto an image plane of the image sensor. The optical characteristics of the lens will determine in part the characteristics of the image the image sensor captures. Different lenses can be used for different applications. For example, telephoto lenses having long focal lengths can be used to capture images of distant objects. Telephoto lenses have a narrow field of view, meaning that while they tend to magnify the size of distant objects, they only capture a small portion of the total field of view as compared to the naked eye. Wide angle lenses in contrast have short focal lengths and wide fields of view. Wide angle lenses can be used to capture images that have more objects than can be seen by the naked eye without turning the head.

An extreme form of wide angle lens is the so-called "fisheye" lens. With the advent of panoramic images for a variety of uses (including for example autonomous vehicle object recognition using deep neural networks to detect patterns), fisheye lenses have become increasingly popular. A fisheye lens is an ultra wide angle lens that has a very wide field of view, e.g., in excess of 100 degrees. Fisheye lenses can be useful when it is desirable to image wide views (e.g., the entire sky, a wide view of the road ahead, a sweeping landscape, etc.). Fisheye lenses for automotive applications provide an advantage of a wider field of view from a single camera, meaning that fewer image sensors can achieve full coverage of the same area. Other applications that benefit from fisheye imaging include telepresence and surveillance/ intelligent video analytics, where a single stationary camera may be used to capture an entire room or other space.

Figure 2B:
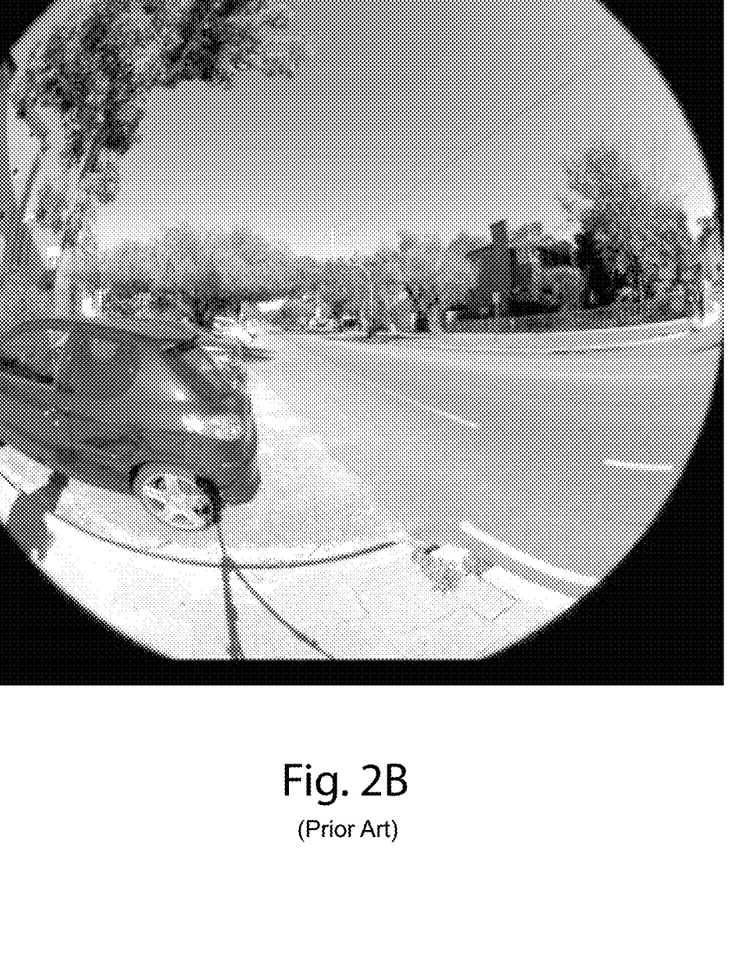
FIG. 2B shows an example fisheye lens image

As FIG. 2B shows, such fisheye lenses distort the image based on a mapping function or projection. Since the fisheye lens typically comprises a circular piece of glass or other material with high refractive index, the image the fisheye lens projects onto the image sensor plane is typically non-rectangular and usually in the shape of a circle or an ellipse. In many common camera arrangements, the lens projects a circular or elliptical image which is fully contained within a rectangular sensor array. A so-called "full frame" fisheye camera may fill the entire rectangular frame with exposed image data, but some of the fisheye image will fall outside of the rectangular frame.

Figure 2C:
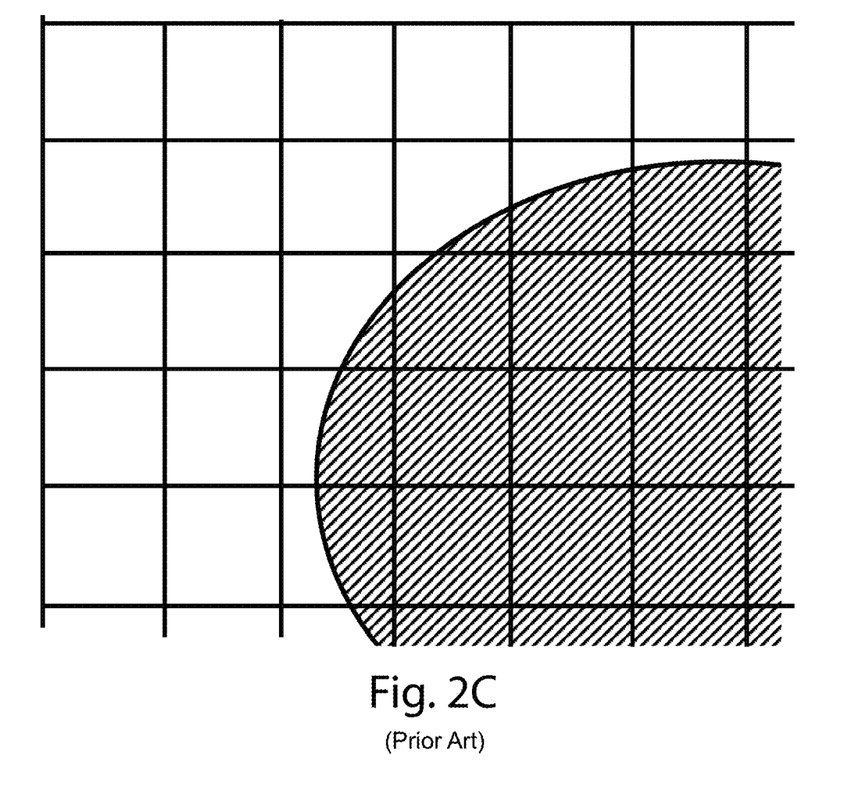
FIG. 2C shows an example projection of a fisheye lens onto the image plane of a rectangular image sensor.

There is no good way to fit a fisheye image into a rectangle without losing some of the light that has been captured. In the "full frame" example, imaging information that falls outside the edges of the imaging frame are lost. In the "circular" example, because the image is circular or elliptical, it does not expose the pixels in the corners of a rectangular array and so there is blank space—portions of the image sensor that are not exposed. See FIG. 2C. Thus, if the entire rectangular image sensor is read out, many pixels that contain no image information will be read out along with the pixels that do contain useful image data. It is desirable in automotive and other applications to perform other readout, e.g., elliptical, to economize on the amount of blank space that must be read from a non-elliptically (e.g., square or rectangular) shaped image sensor array.

Sparse Scanout Frame Format—Example 1

Figure 3A:
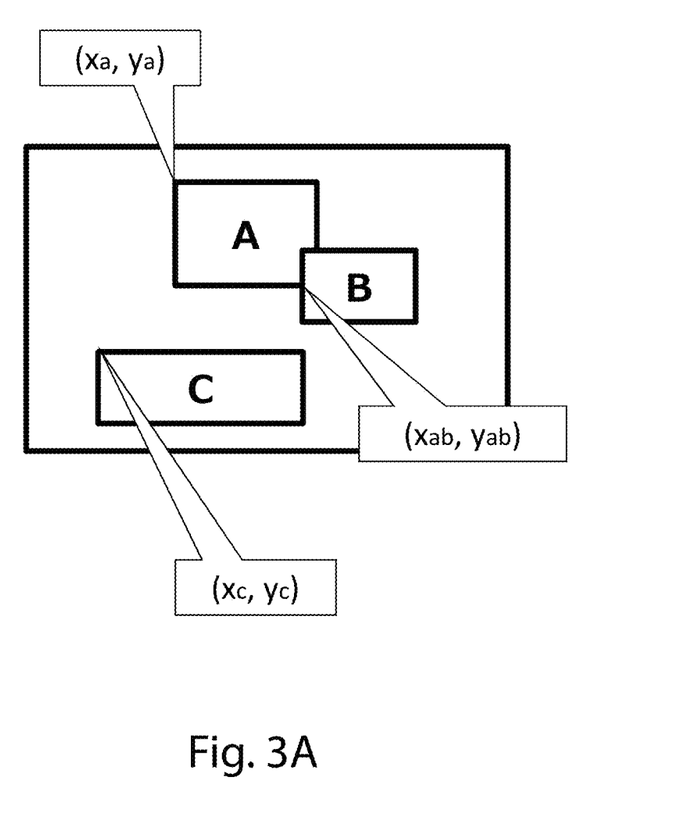
FIG. 3A shows an example sensor image having three scanout regions A, B and C.
Figure 3B:
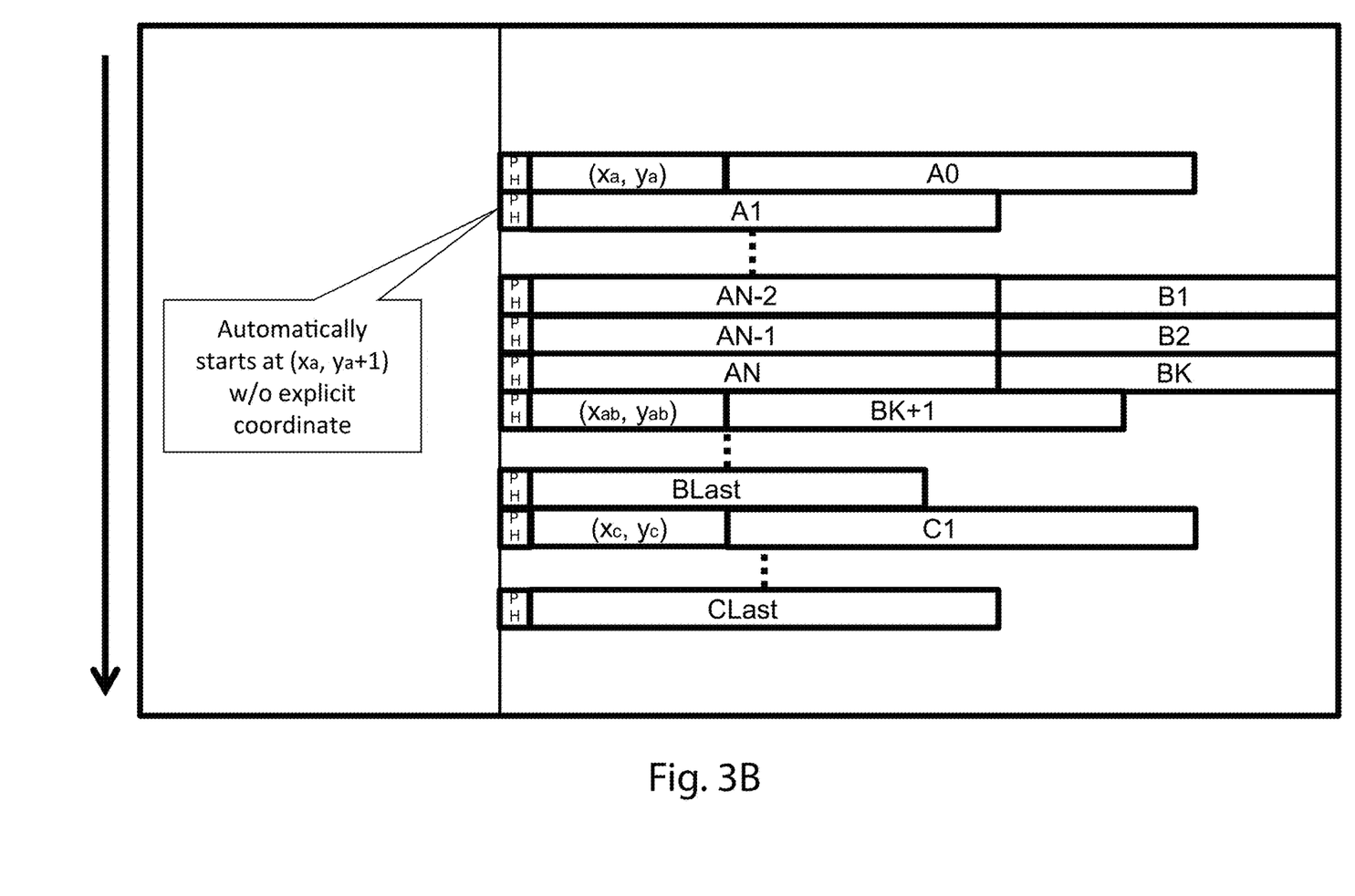
FIG. 3B shows an example readout transmission format for the FIG. 3A scanout regions.

FIGS. 3A and 3B show a basic Frame configuration assuming non frame memory and Line based read-out. FIG. 3A shows three readout areas: A, B and C, and FIG. 3B shows example transmission of long packets containing the image data corresponding to those readout areas (each long packet being preceded by a packet header PH).

As FIG. 3A shows for this particular example, areas A and B overlap each other, whereas area C does not overlap either area A or area B. In addition, in this particular example, each of areas A, B and C is rectangular but need not be in general. Such areas A, B and C could in some applications be localized regions of interest, e.g., where objects of interest have been previously detected or are otherwise known to exist. As one example, in a surveillance application, the image sensor may have a local face detection circuit that detects all faces in the image, and the image sensor sends the host only data corresponding to detected faces. In other example contexts, the host can (for whatever reason) command the camera to send only specified portions of the captured image, or the camera could use conventional segmentation processes to detect those portions of the captured image that are not dark and transmit only those non-dark portions.

In FIG. 3A, the upper left-hand corner of region A has the address/location (xa, ya), and the upper left-hand corner of region C has the address/location (xc, yc). One approach followed by the example non-limiting embodiments is to transmit the location where the image sensor readout process is going to transmit in an efficient fashion. If the readout will be rectangular, then it is possible to save bandwidth by not transmitting coordinates for every packet. The X and Y coordinates are included in packets with discontinuities, and the Packet Headers specify whether coordinates are included in MIPI long packets. If no coordinates are specified, the next packet starts at the same X coordinate as the previous one, but on the next line.

Thus for example, readout of area A begins by transmitting a packet header PH indicating the long packet contains a coordinate pair and the length of the long packet payload, followed by a pair of coordinates indicating the upper lefthand corner location (xa, ya) of area A, followed by the first horizontal line of image data of area A.

Figure 4A:
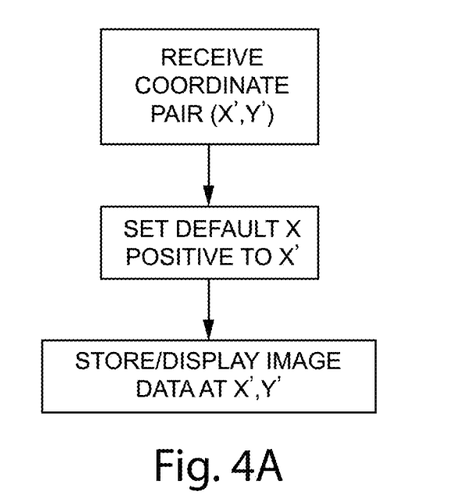
FIGS. 4A and 4B show example receiver decoding processes.
Figure 4B:
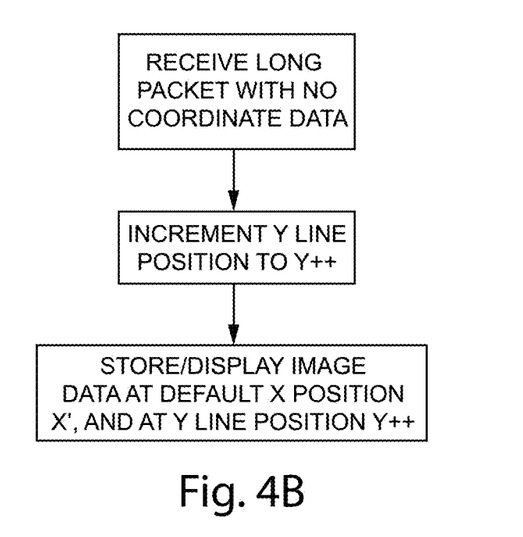

When the readout transmits the next line of data beginning at (xa, ya+1), it does not transmit any new coordinates. In this example, the receiver sets the xa coordinate as the default x coordinate position for all subsequently-received lines of image data that are not preceded by a new coordinate pair (see FIG. 4A), and automatically increments the y coordinate to the next successive line for each next line of image data received without a new coordinate pair (i.e., based on the assumption that the readout is being performed as a raster scan in sequential-line order) (see FIG. 4B). The long packet PH for this next successive line indicates that no coordinate pair is being sent, and indicates the length of the next long packet. Thus, as can be seen in FIG. 3B, once the transmitter explicitly sends a coordinate pair (xa, ya) before the first line A0 of image data for area A, it does not need to send any new coordinates during transmission of the remainder of rectangular area A. The transmitter transmits a Packet Header (indicative of a start of a new line in this example) indicating that the long packet does not contain any new coordinate pair, followed by the next successive line of image data A1 of area A, and the receiver understands that it is to store and/or display and/or process that next line of image data at a location corresponding to the same default starting xa coordinate, but at an automatically incremented y coordinate (e.g., ya+1, ya+2, etc.) line position. See FIGS. 4A, 4B showing instructions that when stored in non-transitory memory and executed by the SoC bring about the results described above. Some SoCs will have these instructions stored in volatile memory, too. For instance, some example approaches may use their digital signal processor (DSP) as an intervening layer between MIPI and RAM sometimes.

Here, the Packet Footer and/or Packet Header in the MIPI standard CSI-2 protocol act as a "carriage return" of sorts in a text rendering (typewriter) analogy, with the previously-transmitted coordinate pair determining the x location (margin) to which the "carriage" is to be returned.

This process may continue the same way to scan out the remainder of area A without need to explicitly transmit any new coordinate pair. On the other hand, if there are multiple unconnected regions transmitted successively on the lines, then each long packet may or will contain an explicit coordinate pair locating the position of the line segment of image data provided by the long packet's payload. If the transmitter and receiver are not constrained to strictly observe scan line order and transmit the entirety of one line before transmitting any of a subsequent line, the transmitter could make use of the efficiencies of the approach described herein to transmit the one rectangular (or other shaped) region comprising multiple successive lines using a first starting coordinate pair, and then subsequently transmit a second rectangular (or other shaped) region using a second starting coordinate pair even when the two regions occupy different portions of the same horizontal line(s) (e.g., readout will then not be in strictly scanline order).

In the example non-limiting implementation shown, the first image data sent for a frame may be preceded by a coordinate pair (e.g., even if the entire frame contents are being sent, in which case the coordinate pair would be 0,0 to indicate the upper left corner of the frame). However, for compatibility, it can be defined that by default the scanout always starts at (0,0), which means that the first image data do not need a coordinate pair. Moreover, the protocol permits each long packet to include a coordinate pair, although an optimization is that a coordinate pair does not need to be sent on a "next" line if the image data for that line begins at the same x position as for the previous line. Thus, if the transmitter optionally does not send a pair of coordinates, the receiver will use a default x starting position as the x coordinate of the last coordinate pair sent, and will set the location of the next image data to be sent on the line immediately subsequent to the line just previously sent (i.e., the y coordinate is incremented by one).

In the FIG. 3A example, area B overlaps area A and appears to the lower right of it. In the example shown, there is no need to transmit the corner coordinate pair of area B. Instead, the transmitter appends the first line of image data of area B to the appropriate line of image data for area A and transmits both the A area image data for that line followed by the B area image data for that line in the same long packet without any new coordinate pair. The receiver stores (and/or displays) the concatenated A+B image data line on the appropriate horizontal line. Because MIPI supports long packets of variable length, such a concatenated line of A area image data+B area image data can have a length that is independent of the length of the immediately previous line containing A area image data only. Similarly, the next long packet to be transmitted can contain the next line of A area image data+B area image data, and so on. This scenario is indistinguishable from a single area A having the same of area A unioned with area B, i.e., the information transmitted or received does not reveal area A and area B as being two discrete areas of regions of interest. To the receiver, the first concatenated line of image data AN−1+B1 appears to be a long single line of image data having a horizontal length corresponding in FIG. 3A to Area A+Area B.

By implication, the overall process for transmitting area A+area B corresponds to transmitting a single non-rectangular area that is the union of area A and area B. The delimiting of areas A, B and C as separate areas of interest thus exists only in theory. No designation of "A region", "B region" or "C region" is transmitted, in some example embodiments; there are only pixels that are sent and pixels that are not sent. There is an advantage to not distinguishing area A from area B (or requiring separate coordinate pairs for each different area) in that the system does not need to look up each of the areas separately. This becomes a significant savings in time and increase in efficiency as the number of regions of interest (and the number of cameras) increases. For example, in a multicamera system where each camera can have many, e.g., 64 or more regions of interest and there are many, e.g., 12 cameras, the total number of regions of interest for the receiver to keep track of becomes large, e.g., 768 regions of interest. The approach disclosed herein is very low cost and is compatible with the standard way in which serialized image transmission systems are designed. On the other hand, if an application does need to know the significance or delimiting of different regions of interest, then region of interest information can be added (as discussed below).

In the example shown in FIG. 3A, area A has N lines with the last line being AN. The transmitter transmits concatenated line AN−2+B1, AN−1+B2, and AN+BK. Once the last line AN of area A has been transmitted, there is no more image data from subsequent lines "below" area A in FIG.

3A. At this point, the transmitter sends a new coordinate pair (xab, yab) that corresponds not to the "corner" point of area B, but rather to the starting location of the first line (BK+1) of area B that is not concatenated with a line of area A. The transmitter follows this new coordinate pair with the image data of area BK+1 corresponding to that line yab, and the receiver interprets the x coordinate xab to indicate the starting x location to store and/or display that BK+1 line of image data. The same process as described above continues for each subsequently-transmitted line of image data of area B, until the last line BLAST has been transmitted and received.

FIG. 3A shows that area C is a rectangular area that has an upper lefthand corner position of (xc, yc). Similar to the example above for transmitting area A, the transmitter transmits that corner coordinate pair (xc, yc) and then transmits the first line of area C image data C1, followed by the second line C2, . . . and the last line CLAST, each line of image data in its own respective long packet. The long packet delimiters are interpreted as virtual "carriage returns", but in this case the virtual "carriage" returns to the x coordinate position xc established as the default by the earlier transmission of the (xc, yc) coordinate pair, as FIGS. 4A and 4B describe.

Although the examples above use an extended packet header PH to indicate whether the long packet contains a coordinate pair, other embodiments do not change the packet header PH to include such information. Especially in automotive applications, there are often components connected between the image sensor and the SoC, e.g., serializers, deserializers and aggregators, that change the format of the data. In such applications, the image sensor and the SoC might share information beyond that of a legacy MIPI standard, but intervening components would nevertheless expect the data stream to strictly comply with that legacy MIPI standard. To maintain compatibility, the packet header PH should maintain its legacy form, although the image data payload could be extended without compromising compatibility. For example, embedded delimiters within the long packet payload may be used to indicate the presence of a coordinate pair, or the coordinate pair could be encoded in a way that makes it easily distinguishable from any possible or practical image data, or out of band metadata could be used to indicate coordinate pairs.

Figure 5A:
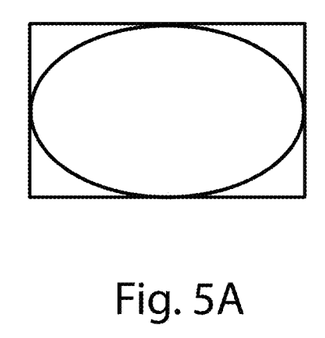
FIG. 5A shows an example elliptical readout area.
Figure 5B:
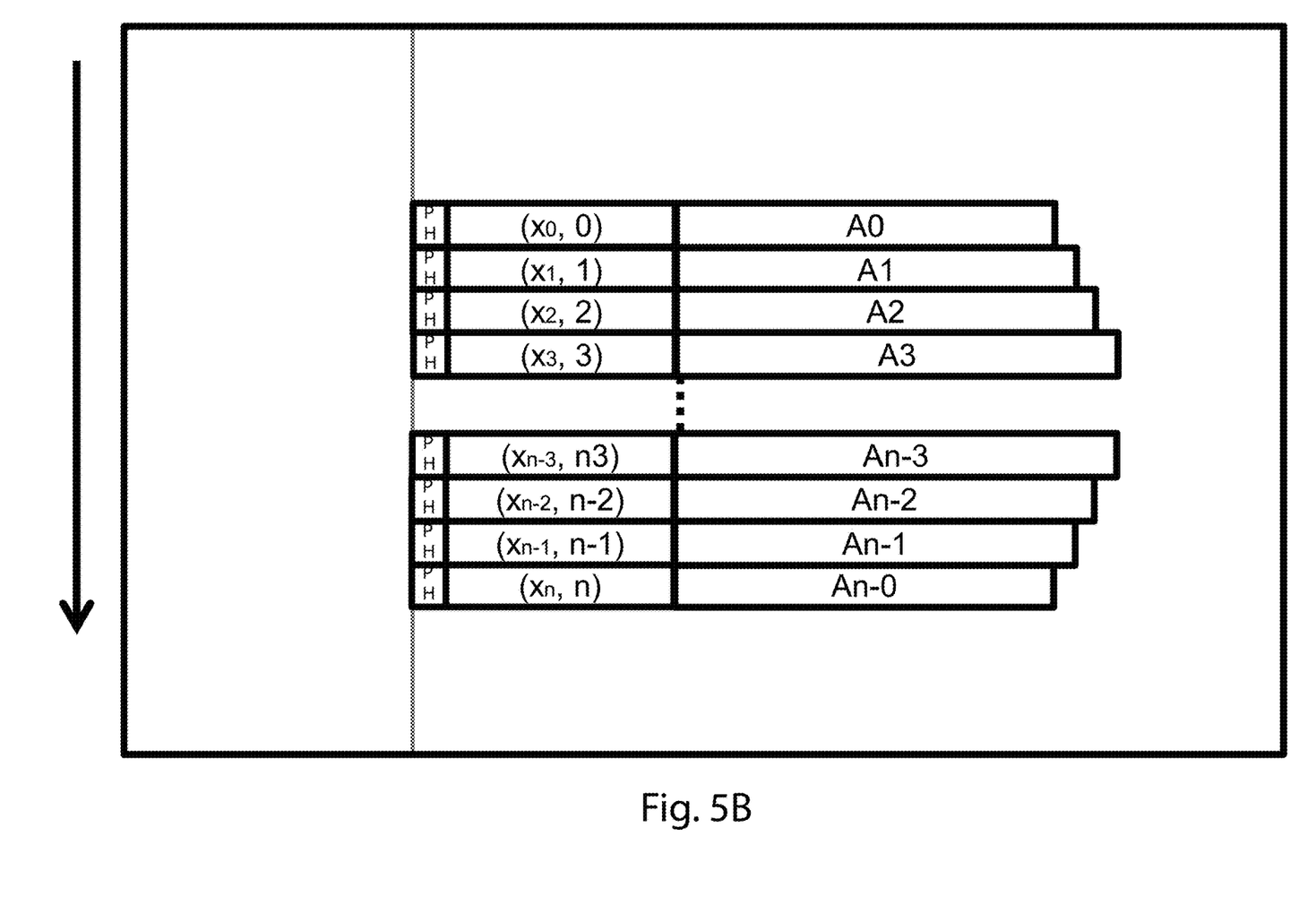
FIG. 5B shows an example readout transmission format for the FIG. 5A elliptical readout area.

FIGS. 5A and 5B show the same implementation above applied to a non-rectangular area such as an ellipse depicted in FIG. 5A. Since the example implementation described above permits the transmitter to transmit a different coordinate pair for each line, the system can use this capability to start each sequential line of image data at a different x position. This allows the transmitter to transmit image data corresponding to a piecewise linear ellipse or any other shape of arbitrary complexity through transmission of a coordinate pair for each line followed by the variable-length image data for that line. Trapezoidal or other lower-cost approximations could be used for further increases in efficiency. Such capabilities come "for free" with the sparse scanout capabilities described above. Additionally, pixel coordinates for crop regions on the sensor in non-rectangular crops can be computed with a low-cost approximation, for instance a piece-wise linear curve for start and stop X coordinates.

To reduce complexity, in this example there is no additional region of interest embedded metadata (see below) for the elliptical scanout area because in most usages, there will be only a single elliptical area corresponding to the portion of the image sensor plane exposed by the projection from a fisheye lens, which area does not change frame-by-frame because it is a constant imaging characteristic of the camera. Hence, there is no need for regularly-updated ROI information in such implementations. But other implementations may benefit from the additions of ROI capabilities.

Including Region of Interest Information—Example 2

Example improvements to the current MIPI CSI-2 standard supports region-of-interest identification to designate one or more subsets of a captured image as regions of interest. One example non-limiting approach adds some extensions/options on the current Frame/packet header/footer to provide minimal changes from the current CSI-2 format. In one example non-limiting embodiment, it is possible to start with one or more simple region-of-interest shapes (e.g., a rectangular shape) to provide an initial version of smart region-of-interest designation. For further improvements, arbitrarily-shaped regions-of-interest would be useful to consider. A further example non-limiting design allows space in the design for arbitrary shapes, even if not yet implemented.

It is also desirable to introduce a new scheme to support video stream/moving objects. Such new scheme in one example non-limiting embodiment may need or use an additional format beyond the existing region-of-interest sensor (e.g., industrial sensors) which supports only "Still image". A smart region-of-interest sensor may expand this to "Video Stream" for Internet-of-Things ("IoT") applications. Overlapped regions-of-interest may be delivered efficiently for IoT applications.

Figure 6:
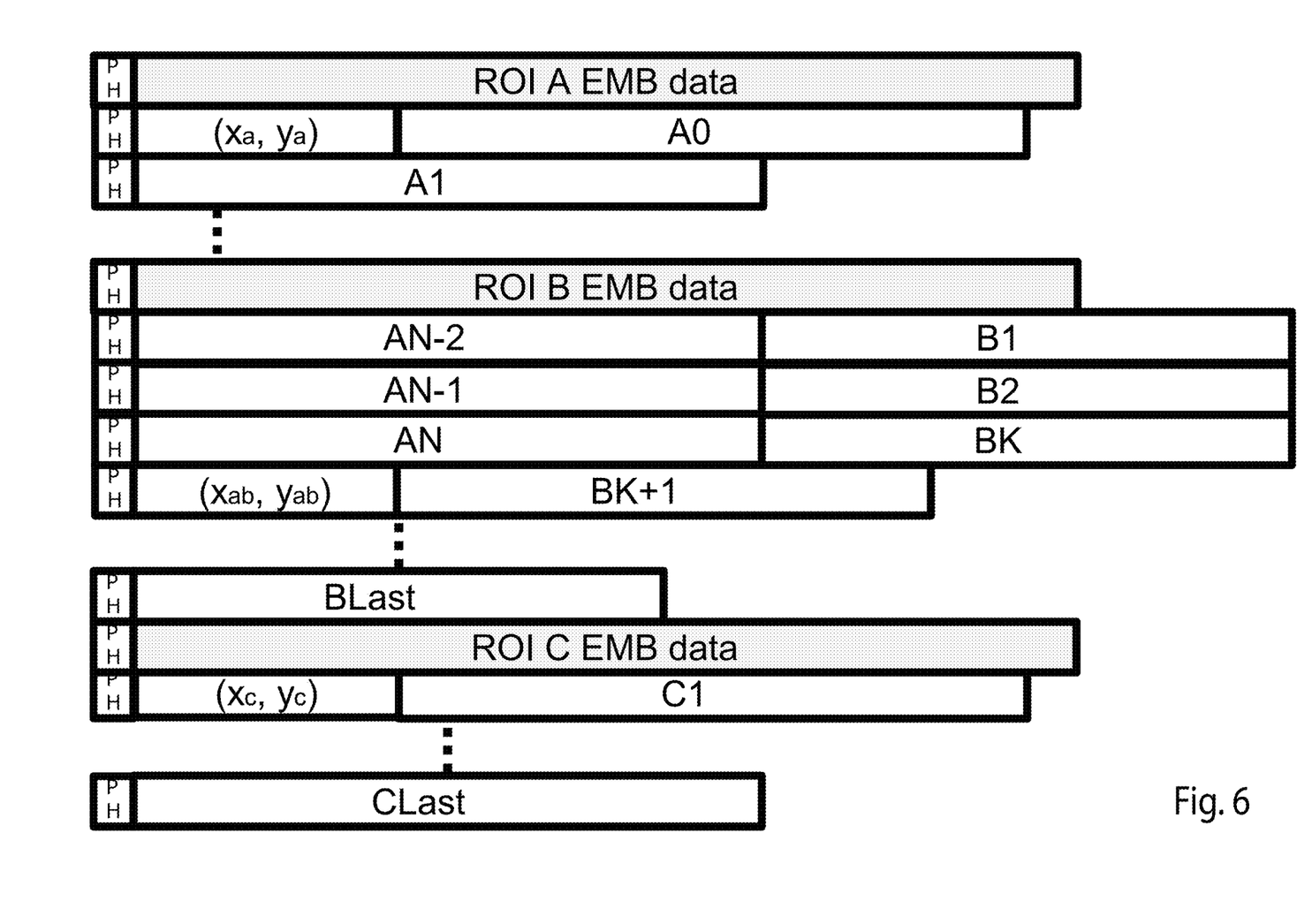
FIG. 6 shows an example readout transmission format including embedded region of interest data.

FIG. 6 shows a further example in which region of interest identification information is included to provide a standardized embedded data format for a region of interest. Comparing FIG. 6 with FIG. 3B, one can see that in the FIG. 6 example the transmitter transmits an additional long packet "ROI A EMB data" (region of interest A embedded data) before transmitting the image data for region A, and similarly transmits embedded ROI (region of interest) data for region B before transmitting image data for region B. In this example, the "ROI B EMB data" long packet is transmitted just before the transmitter transmits image data AN−2 for region A concatenated with image data B1. The receiver interprets this embedded ROI data packet as applying to the image data B. In this particular example, the transmitter can transmit one embedded data packet per region of interest. The embedded region of interest data can occur anywhere in or after the frame. The embedded region of interest data is sent in a long packet, and accordingly can provide various metadata for the region of interest, including any or all of the following:

Window ID (n)
Physical sensor coordinates (xsens, ysens) (this provides ROI support for fixed-width rectangular ROIs even on systems that do not support sparse scanout)
Scanout coordinates (ximg, yimg)
Window size (xsize, ysize)
Scaling factor (xscale, yscale)
Optional tagged information:
identified object
Exposure/gain information
Confidence
Priority
Other extensions: e.g., CPU sensing acceleration, etc.

Figure 7:
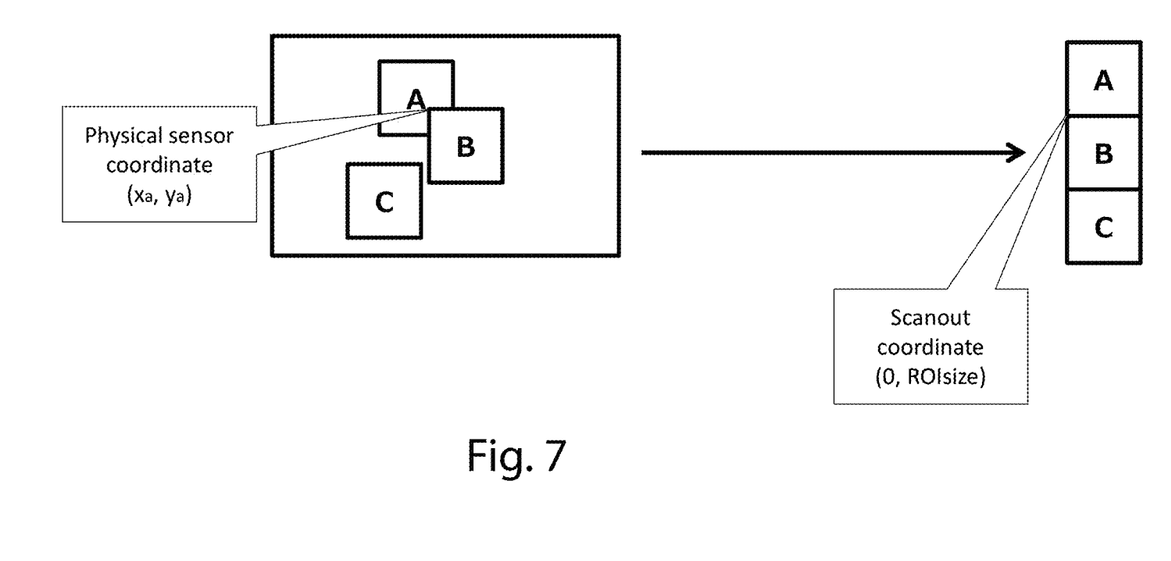
FIG. 7 shows an example mapping between physical sensor coordinates for scanout areas and logical scanout coordinates.

FIG. 7 shows that regions of interest can be reorganized by the interface for legacy CSI system support in a way that is independent of the sparse scanout approach discussed above. If the image sensor is capable of rearranging image elements for transmission rather than transmitting them in strictly sequential line order, the sensor rearranges them into one logical large frame, and then transmits the ROI information indicating where each ROI was physically found on the sensor and where the ROI is logically placed in the image the transmitter is sending. From the receiver's perspective, the received image data looks like a single, very tall frame (see right-hand side of FIG. 7) because the coordinates are sent out of band along with the embedded ROI metadata. The ROI metadata does not need to be processed immediately upon receipt. Once the receiver receives and stores the information, the CPU or GPU can later examine the ROI data to determine where each ROI should be placed in the received frame. For example, this information can be transmitted using legacy CSI protocol in a way that does not require sparse scanout as described above. This approach is also 100% compatible with SoC implementations that do not support sparse scanout.

While the examples above assume a scanout in horizontal row order, vertical column scanout or point-all-addressable scanout could be used instead or in addition.

All documents cited above are hereby incorporated by reference as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. Image data transmission method comprising:
defining, within a readout image area, a scanout area that spans plural overlapping regions of interest;
determining a position of the scanout area within the readout image area; and
reading out less than all pixels of the readout image area, including transmitting, within a long packet of a serial image data transmission, (a) image data from the scanout area, the image data spanning the plural overlapping regions of interest, and (b) a pixel coordinate applying to all of the plural overlapping regions of interest, the pixel coordinate indicating the determined position of the scanout area within the readout image area.

2. The image data transmission method of claim 1 wherein the long packet further comprises a further coordinate indicating readout image area line number.

3. The image data transmission method of claim 1 further including embedding, in the long packet image data, region of interest information for the plural overlapping regions of interest corresponding to the defined scanout area.

4. The image data transmission method of claim 1 further including not transmitting portions of the readout image area outside the defined scanout area.

5. The image data transmission method of claim 1 wherein the defined scanout area is elliptical.

6. The image data transmission method of claim 1 wherein the defined scanout area is of arbitrary shape.

7. The image data transmission method of claim 1 further including subsequently transmitting a further long packet different from the first-mentioned long packet, the further long packet not including any pixel coordinate and containing image data to be located by reference to the pixel coordinate indicating the determined position included in the first-mentioned long packet.

8. A system for sparse scanout transmission comprising:
an image sensor comprising a set of pixels covering a readout image area, the image sensor being configured to select a non-rectangular scanout area smaller than the readout image area, —and to determine a starting position of a line corresponding to a portion of the selected non-rectangular scanout area within the readout image data that spans plural overlapping regions of interest; and
an interface configured to include, within a long packet of a serialized image data interface transmission, a coordinate indicating the starting position of the line, the coordinate applying to all of the plural overlapping regions of interest.

9. The system of claim 8 wherein the coordinate is paired with a further coordinate indicating a number of the line.

10. The system of claim 8 wherein the interface is configured to embed, within the long packet, region of interest information corresponding to the selected scanout area.

11. The system of claim 8 wherein the interface is configured to not transmit portions of the readout image area outside the selected scanout area.

12. The system of claim 8 wherein the selected scanout area is elliptical.

13. The system of claim 8 wherein the selected scanout area is of arbitrary shape.

14. The system of claim 8 wherein the interface is configured to subsequently transmit a further long packet not including a coordinate, the further long packet containing image data to be located by referencing a previously-transmitted coordinate.

15. A sparse scanout receiver comprising:
an interface configured to receive a long packet including a coordinate applying to plural overlapping regions of interest, the coordinate indicating a starting position of a line within a readout image array corresponding to scanout image data contained in the long packet, the scanout image data including pixels from each of the plural overlapping regions of interest;
the interface being further configured to receive a further long packet not including a coordinate indicating a starting position of a line corresponding to further scanout image data in the readout image array contained in the further long packet; and
a processor operatively coupled to the interface, the processor configured to apply the coordinate to a horizontal starting position of the further scanout image data while incrementing a line designator for the first-mentioned scanout image data to obtain a line designator for the further scanout image data.

16. In a MIPI CSI-2 protocol of a type including short packets and long packets, the long packets including a packet header (PH) indicating the length of a payload containing serialized image data,
an improvement comprising:
(a) including a pair of coordinates in at least some long packet payloads or in an extended packet header, the coordinate pair indicating an upper lefthand corner position in a planar coordinate space associated with serialized a scanout image data within one or more payloads; and
(b) including within the long packet headers an indicator that the packet contains a coordinate pair specifying a variable position of the scanout image data within a larger sensor readout image array, the coordinate pair applying in common to plural regions of interest contained within the serialized scanout image data.

17. The improvement of claim 16 further comprising embedding region of interest information in further long packets.

18. The improvement of claim 16 wherein only some long packet payloads contain coordinate pairs.

* * * * *